No. 677,580.  
P. & O. MADLENER.  
CARBONATING APPARATUS.  
(Application filed Feb. 27, 1901.)  
Patented July 2, 1901.  
(No Model.)
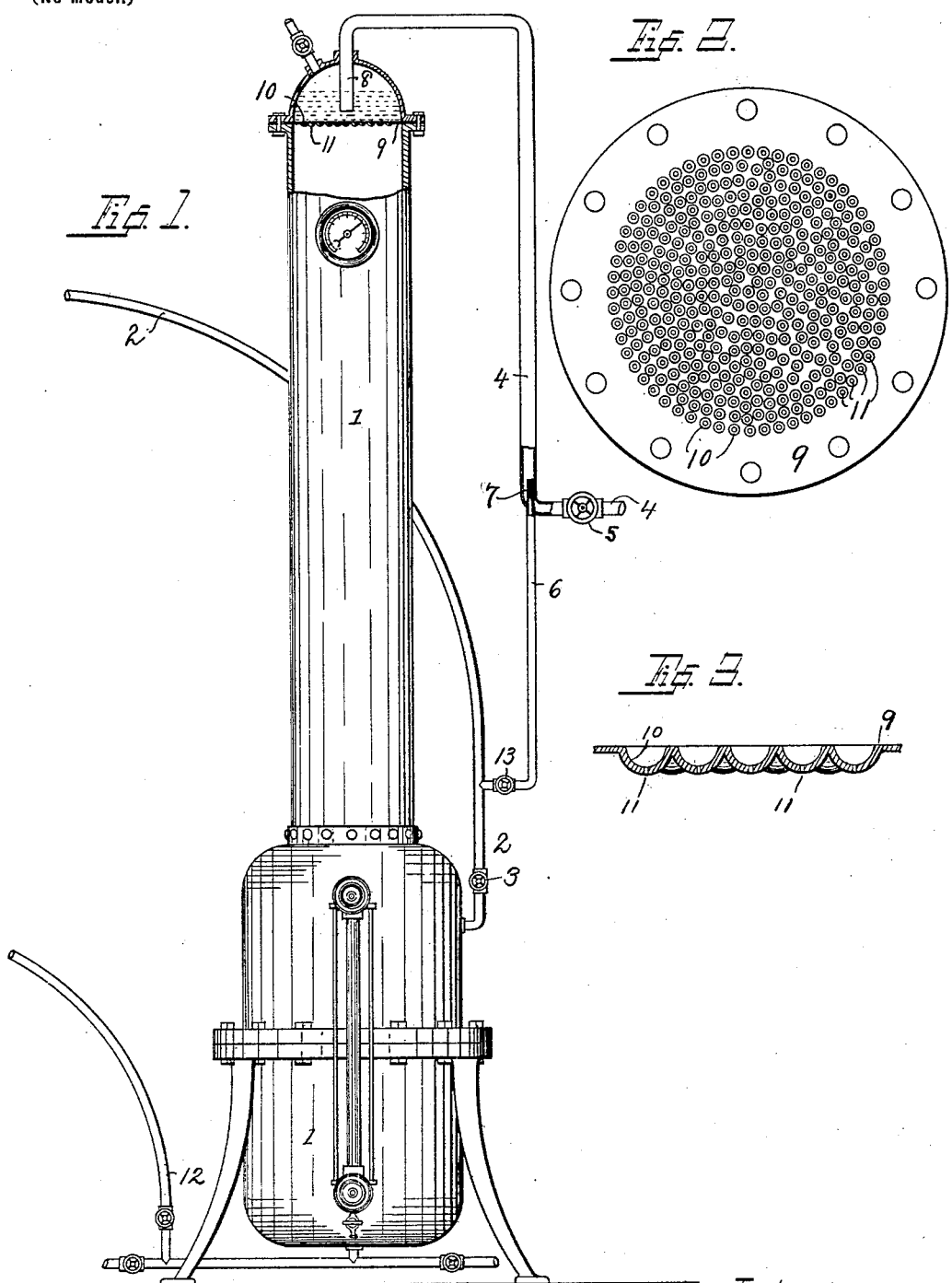

UNITED STATES PATENT OFFICE.

PHILIP MADLENER AND OTTO MADLENER, OF MILWAUKEE, WISCONSIN.

CARBONATING APPARATUS.

SPECIFICATION forming part of Letters Patent No. 677,580, dated July 2, 1901.

Application filed February 27, 1901. Serial No. 49,098. (No model.)

*To all whom it may concern:*

Be it known that we, PHILIP MADLENER and OTTO MADLENER, citizens of the United States, residing at Milwaukee, county of Milwaukee, in the State of Wisconsin, have invented new and useful Improvements in Carbonating Apparatus, of which the following is a specification.

Our invention relates to improvements in devices for carbonating liquids.

The object of our invention is to provide means for more thoroughly mixing the gas with the liquid.

In the following description reference is had to the accompanying drawings, in which—

Figure 1 is an elevation of our invention, with the upper end broken away in central longitudinal section. Fig. 2 is a top view of the distributing-screen. Fig. 3 is a detail sectional view of the screen, showing the peculiar form of drip-apertures.

Like parts are identified by the same reference-figures throughout the several views.

1 is an inclosing chamber or receptacle. 2 is a gas-supply pipe leading thereto and provided with a valve 3.

4 is a water-inlet pipe communicating with the receptacle 1 at its upper end, and 6 is a branch pipe leading from the gas-supply pipe 2 and arranged to discharge longitudinally into the water-pipe 4 through a nozzle 7, whereby gas may be injected into the water of pipe 4. The pipe 4 is provided with a downwardly-extending portion 8 in the interior of the chamber 1 and discharges upon a screen 9, subdividing the interior portion of the chamber transversely. The screen 9 is provided with a series of conical or spheroidal depressions 10, each provided with a drip-aperture 11 at its lowest point, whereby the liquid passing through said aperture will drop into the lower portion of the chamber 1 independently of that passing through any of the other apertures, for the downwardly-projecting walls of the depressions 10 will prevent the liquid from spreading over the under surface of the screen 9 and uniting with the liquid from the other apertures to form streams, as would be the case if the under surface of the screen 9 were flat. The carbonating liquid is drawn off from the chamber 1 through a pipe 12, communicating with the bottom thereof.

In operation the valves 3 and 13 in the gas-supply pipes 2 and 6, respectively, are opened to admit the gas (usually carbonic-acid gas) to the chamber 1, the gas being forced through said pipes under pressure from any suitable source of supply. Water is then admitted through the valve in the water-pipe 4, said pipe, and portion 8 thereof to the chamber 1 and discharges from the portion 8 of the pipe downwardly upon the screen 9. The pipe 4 is of such capacity that the liquid will accumulate upon the screen 9 to a point above the lower end of the pipe 8, as indicated in Fig. 1, when the gas in this portion of the chamber will be compressed in the upper portion of the chamber, and its reactionary pressure will assist in forcing the liquid through the drip-apertures 11 in the screen 9. The peculiar shape of these apertures prevents the drippings from uniting by adhesion to the under surface of the screen and causes the liquid to be minutely subdivided and permitted to drop in the form of a spray through the lower portion of the chamber. As this portion of the chamber is filled with gas under pressure, the liquid will be thoroughly charged therewith before reaching the bottom of the chamber, whence the carbonated liquid may be drawn off through the pipe 12.

We attach great importance to the provision of means for preventing the union of the streams or drippings on the under side of the screen 9. We also consider it important to partially mix the gas and liquid before its admission to the chamber 1, as the specific gravity of the liquid is thereby lowered and the liquid thus rendered more subject to subdivision in passing through the screen.

Having thus described our invention, what we claim as new, and desire to secure by Letters Patent, is—

1. In a device of the described class, the combination of an inclosing chamber; a partition-wall subdividing the same and provided with projections on its under surface; ducts leading through said partition-wall to the projections; a liquid-supply pipe communicating with the chamber above the partition, and extending downwardly within the chamber to a point in proximity to the partition, said liquid-supply pipe having a greater capacity than the aggregate capacity of the ducts in the partition.

2. In a device of the described class, a receptacle subdivided by a horizontal partition-wall, having downwardly-extending projections, and ducts leading through said wall and projections; a gas-supply pipe communicating with said chamber below said partition; a liquid-supply pipe communicating with said chamber above the partition and extending downwardly therein toward said partition-wall; and a gas-supply pipe arranged to discharge into the liquid-supply pipe; said liquid-supply pipe being of greater capacity than the combined capacity of said ducts, whereby a body of liquid under pressure is maintained on the upper surface of the partition in sufficient quantity to cover the mouth of the supply-pipe, and prevent the separation of the gas from the liquid.

In testimony whereof we affix our signatures in the presence of two witnesses.

PHILIP MADLENER.
OTTO MADLENER.

Witnesses:
W. H. GRAEBNER,
PAUL F. WENZEL.